United States Patent [19]

Bozyk et al.

[11] Patent Number: 4,829,713
[45] Date of Patent: May 16, 1989

[54] GUIDANCE RECEPTOR CUP SYSTEM FOR AUTOMOTIVE MODULAR DOOR PANELS

[75] Inventors: Richard P. Bozyk, Roseville; John P. Quan, Dearborn Heights, both of Mich.

[73] Assignee: United Technologies Automotive, Inc., Dearborn, Mich.

[21] Appl. No.: 177,728

[22] Filed: Apr. 5, 1988

[51] Int. Cl.[4] .............................................. E06B 3/00
[52] U.S. Cl. ........................................ 49/506; 49/503; E06B/3/00
[58] Field of Search ................... 49/502, 503, 506, 348

[56] References Cited

U.S. PATENT DOCUMENTS

| | | | |
|---|---|---|---|
| 3,782,036 | 1/1974 | Clark et al. | 49/502 |
| 4,606,148 | 8/1986 | Gandini | 49/503 X |
| 4,766,697 | 8/1988 | Boileau | 49/348 X |

Primary Examiner—Philip C. Kannan

[57] ABSTRACT

In the assembly of a door panel module (1) with the door frame (2) in the assembly line of an automotive manufacturing operation, an automatic interfacing system for a multi-component mechanical system, such as for example the door locking mechanism, part of which is on the panel module and the other part of which is on the door frame. The interfacing system includes a receptor cup (20) on the door lock actuator (10) on the panel module and an orthogonally extending distal tip (34) of the door lock actuating rod (30) mating therewith. The receptor cup includes a circular, conically shaped, tapered surface (21) which leads into a centrally located, locking opening (22), into which the distal tip of the locking rod becomes engaged, after the tapered surface through the lateral movement of the receptor cup has guided and caused it to become longitudinally engaged with the centrally located opening. The end portion of the locking rod includes a dog leg or inverted "U" section, which extends along side (rod section 31), over (section 32) and into (section 33) the receptor cup, when the door panel module is mated with and fastened to the door frame. The tapered surface of the receptor cup causes the locking rod to become automatically engaged and locked into the receptor cup in the assembly operation. The receptor cup can be carried on a pivoting link arm (12), while the distal leg portion of the locking rod can include a nub (50) with an enlarged head (54) for positively locking the rod to the receptor cup (FIG. 7).

11 Claims, 3 Drawing Sheets

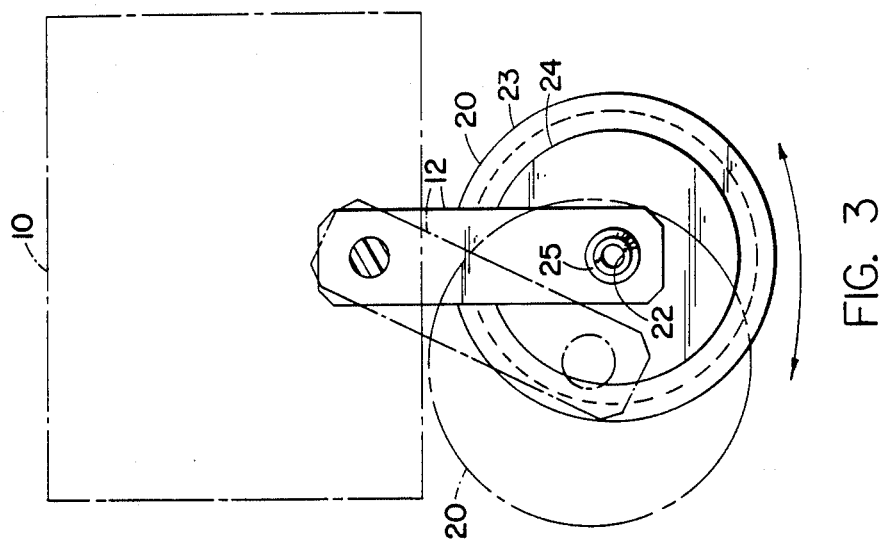
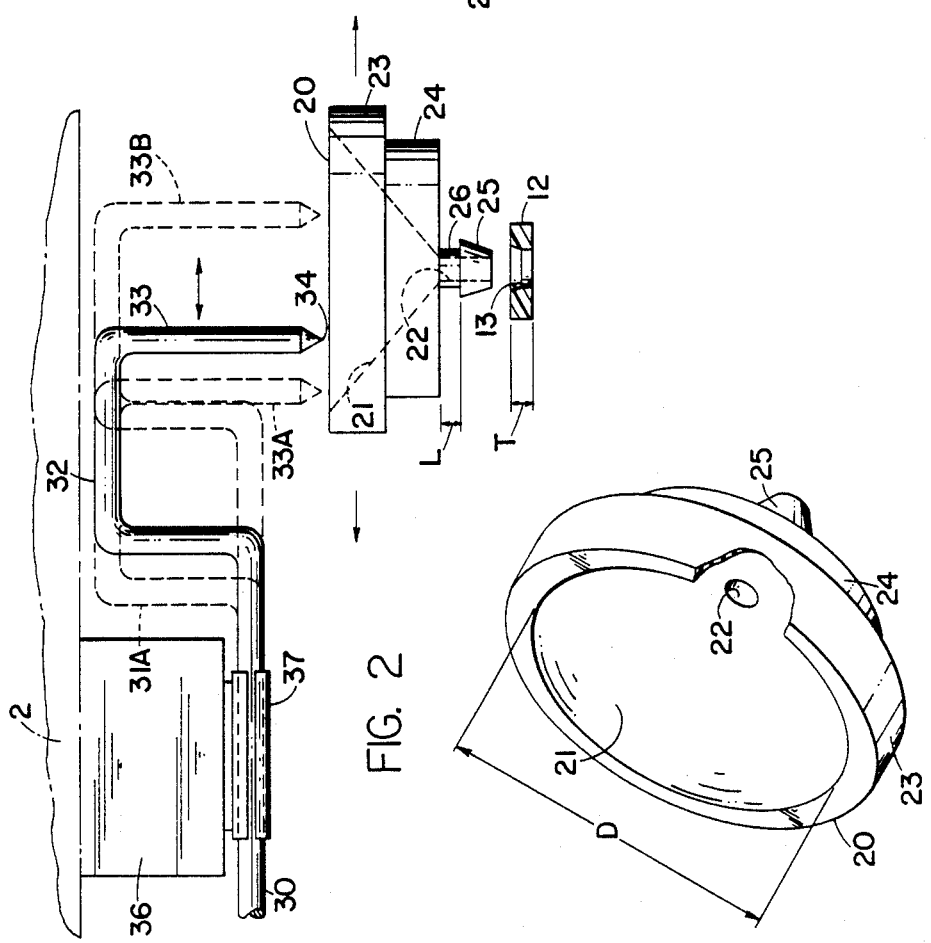

GUIDANCE RECEPTOR CUP SYSTEM FOR AUTOMOTIVE MODULAR DOOR PANELS

TECHNICAL FIELD

The present invention relates to automotive modular door panel systems in which a modular door panel, such as for example, an interior trim panel module, which carries on it a number of the mechanical and/or electrical components for the door, such as for example door lock components, is attached to the main door frame of a vehicle in the main assembly line process. The present invention is more particularly directed to the coupling of the mechanical elements between the door panel module and the main door frame in the attaching process. Even more particularly, the present invention relates to the automatic interfacing coupling between the door lock actuator on the modular door panel and the door lock itself mounted on the door's main frame.

BACKGROUND ART

Heretofore, it has been the general practice to completely assemble all of an automobile's door components on line in the main assembly line of the automotive manufacturer. However, there has been a recent move to accomplish a substantial amount of the door assembly off line, typically at a remote, subcontractor's facility. In this subassembly, the subcontractor might, for example, provide a modular interior door trim panel upon which are mounted a significant number of the mechanical and electrical components for the door. Note, for example, co-pending U.S. patent application Ser. No. 07/097,555, filed Sept. 15, 1987, entitled "Modular Trim Panel Unit for Motor Vehicle Doors" of R. Basson et al.

In such subassembly operations, it is necessary to ultimately couple the various mechanical components which are on the main door frame with the various mechanical components provided on the modular door panel in the subassembly operation. One approach taken in the prior art has been to "eyeball" the coupling interface(s), as the modular door panel is brought into contact with the main door frame, as the two are being assembled and fastened together. Such an approach requires relatively precise positioning of the two door panel/frame elements, as well as relatively carefully controlled movement of the two door elements as they are brought together for fastening. An example of this approach is believed to be Offenlengungsschrift 1,955,213 of Bernard Forstingn et al (date of disclosure May 19, 1971).

Another exemplary prior art reference is U.S. Pat. No. 4,151,683 of Narita et al, issued May 1, 1979, entitled "Door For a Vehicle, Especially Passenger Motor Vehicle". In this patent, a slit or other opening is required for access into the interior of the door panels being attached together for mating of the mechanical components, which in the case of this patent, are window drive components.

In contrast, the present invention provides for the automatic mating of mechanical components, particularly, the door locking components, as the modular panel is being interfaced and attached to the main door frame in the main assembly operation, without the need for precise positioning or high controlled movement. Note is also made of assignee's co-pending U.S. patent application Ser. No. 07/097,230 filed 09/15/87, now U.S. Pat. No. 4,766,697, entitled "Modular Panel Assembly, Particularly Automotive Door Panels With Independent Coupling of Modular Components" of Daniel E. Boileau, which has in some respects a similar approach for, for example, coupling window drive components.

DISCLOSURE OF INVENTION

The present invention thus provides for the automatic interfacing and coupling of mechanical components between at least one element provided on the modular door panel and another element mounted on the main door frame, particularly, the door lock components, during the interfacing and assembly operation of the modular door panel to the main door frame in the main assembly line operation.

To achieve this in the preferred, exemplary embodiment of the present invention, a receptor cup is located on the door lock actuator subassembly on the modular door panel, while a rod, which has both a relatively short, laterally extended portionn as well as a relatively long, longitudinally extended portion, is provided as part of the door lock subassembly mounted on the main door frame.

The cup, which has an interior, diverging surface leading into a centrally located orifice or opening, automatically guides the distal tip of the rod into the opening, as the door module panel is interfaced with the main door frame in the assembly operation. Once the distal tip enters the centrally located opening, the door locking actuator subassembly on the modular door panel becomes locked to the door lock linkage on the main door frame.

Thus, as will become more apparent in considering the drawings of the preferred embodiment, as the rod approaches the receptor cup, the taper or diverging surface of the cup guides the rod into the central opening until it is at "home" in the central opening. Forces acting on the rod will not allow disengagement of it from the receptor cup until the modular panel is removed back out in the opposite direction from its assembly, for example, during maintenace or repair work after the vehicle has been in use.

If desired for further, enhanced mechanical integrity of the locking engagement between the rod and the receptor cup, a nub, for example, can be placed on the distal end of the rod, which nub has an enlarged head, which snaps into locking engagement with the terminal bottom of the centrally located opening of the receptor cup.

Some of the advantages of the present invention are that it allows the modular panel assembly to be roboticly assembled with the main door frame, if desired, and there is no preset condition for the initial placement of the latch, either locked or unlocked in its relative position, in the interfacing of the modular door panel to the main door frame. The later is achieved by designing the effective lateral extent of the taper or diverging surfaces to be sufficiently wide or large enough to overlap the limits of the rod movement from its "lock" to its "unlock" positions, as defined by the limits of movement of the actuator arm lock link or rod.

The foregoing and other features and advantages of the present invention will become more apparent from the following further description and drawings.

BRIEF DESCRIPTION OF DRAWINGS

FIG. 2 is a close-up, detail, partial view, showing inter alia the lateral range due to the door lock set (locked or unlocked) of the possible locations of the distal end of the actuator rod with respect to the receptor cup of the modular panel, as the panel is brought into engagement with the door frame, with the tapered guidingn surface of the cup being shown in phantom line; while FIG. 3 is a close-up, detail, underside view of the receptor cup and its link mounting on the door lock actuator on the panel, showing the lateral ranges of movement of the receptor cup as it is pivoted about its pivot attachment of the link to the door lock actuator; while FIG. 4 is a perspective view of the front guidance side of the receptor cup directly showing its taper or diverging surfaces, which guide the distal tip of the rod into the centrally located, locking opening.

FIG. 5 is a side, detailed view illustrating the guided relative movement of the distal tip of the rod as it is being automatically interfaced by the tapered surface of the receptor cup into its central, locking opening, with the receptor cup being laterally moved under its interfacing interaction with the rod tip, as the modular door panel is being longitudinally moved and interfaced with and attached to the main door frame; while

BEST MODE FOR CARRYING OUT THE INVENTION

Figure 1:
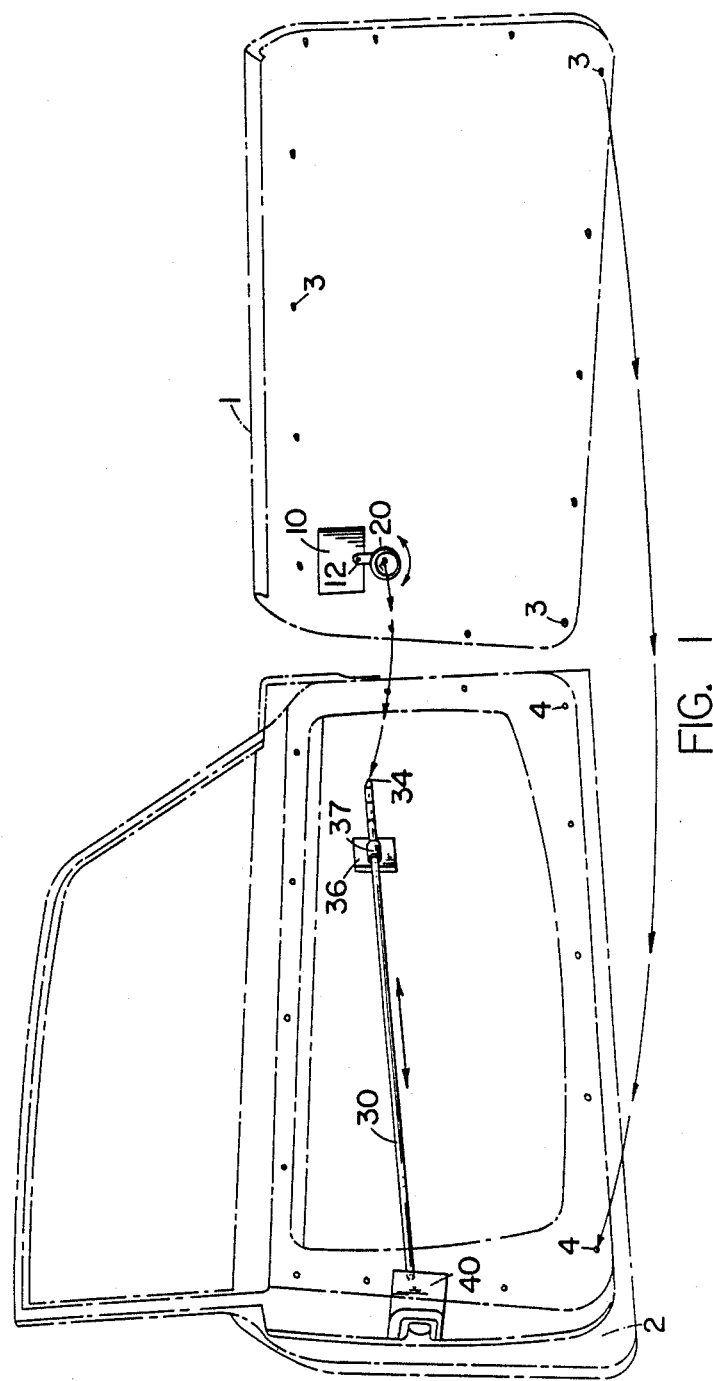
FIG. 1 is a perspective view of an exemplary door panel module, partially cut away, being attached to the main door frame, showing the rod of the door lock linkage initially coming together with the open side of the receptor cup in the initial, interfacing operation, which occurs during the assembly of the modular door panel to the main door frame in the assembly line. However, it is noted that the modular panel and door frame are illustrated at exaggerated side angles to one another in order to better show their facing sides, whereas, in fact, they would generally be parallel to one another as they are interfaced.

As can be seen in the simplified illustration of FIG. 1, an interior trim panel module (such as, for example, like one of those disclosed in assignee's co-pending U.S. patent application Ser. No. 07/097,555, the disclosure of which is incorporated herein by reference) is positioned in front of and is interfaced and mated with the main automobile door frame 2 in the assembly line operation. The trim panel module 1 can, for example, include most of the mechanical and electrical components used within the automotive door, with only a relatively few components being assembled on line within the door frame 2.

Thus, for example, one of the few mechanical components left for direct, on line assembly to the door frame 2 can be the door locking mechanism 40 having a laterally extending, movable rod 30 attached to the door frame by means of one or more attachment blocks 36 carrying a retainer sleeve 37. The retainer sleeve 37 allows for the to-and-fro, lateral movement of the rod 30 (note double headed arrow in FIG. 1 and the top set of the oppositely directed, horizontal arrows in FIG. 2).

The rod 30 ends in a distal tip 34, which can be pointed or rounded, and extends longitudinally or orthogonally from the main plane defined by the door frame 2. As the trim panel module 1 is interfaced with door frame 2, a receptor cup 20, in a manner described more fully below, is used to automatically interface and lockingly mate and engage with the distal tip 34 of the door lock linkage rod 30.

As can best be seen in FIGS. 1 & 3, the receptor or guidance cup 20 is suspended from the power door lock module 10 by means of a driven pivoting link arm 12, all of which are included as part of the interior trim panel module 1, which has been all preassembled off-site in a sub-assembly operation, typically by a subcontractor to the automotive manufacturer.

It is noted that FIG. 1 illustrates the interior trim panel module 1 and the door frame 2 at exaggerated side angles with respect to one another, as if they were joined together in a "clam shell" like fashion. However, it should be understood that this was illustrated in this way in order to best show the operative components of the facing sides of the panel and frame used in the exemplary embodiment of the present invention. In fact, the trim panel module 1 is more typically initially positioned in parallel, frontal array to the door frame 2 and then either moved in towards the door frame 2 in direct fashion, maintaining an at least general parallel alignment between the two, or, alternatively, the top of the trim panel module 1 is initially engaged with a top portion of the door frame 2 and pivoted down in the interfacing, juxtaposition and attachment steps. In either case, a series of, for example, spaced snap fastening pins 3 lockingly interface with like located openings 4 on the door frame 2.

As can best be seen in FIG. 2, the interfacing rod 30 includes toward its interfacing end an inverted "U" shaped or "dog-leg" portion having a first leg 31, a laterally extended leg 32, and a final, orthogonal leg 33, which ends in the distal tip 34. Depending upon whether or not the door lock mechanism 40 is in its locked or unlocked disposition, the initial leg 31 will occupy for example the position indicated by the phantom lines, initial leg portion 31A or a position further to the right, when viewed from the perspective of FIG. 2, with the end leg portion 33A either occupying the leftmost position indicated by the phantom lined leg section 33A or the right-most position indicated by the phantom lined leg portion 33B, respectively.

Regardless of whether or not the rod 30 is in its locked or unlocked position, the preferred embodiment is preferably designed so that the distal tip 34 will come within the designed maximum opening "D" (note FIG. 4). The dimension "D" can be, for example, of the order of about one and a half inches, or typically twice the amount of "throw" of the rod in its movements between its locked and unlocked positions. The dimension "D" is defined by the outer most extent of the diverging, guidance surface 21, which, when viewed from the perspective of FIG. 2, has a taper (note dashed line surface 21), forming a "V" shape, leading at its apex into the centrally located, relatively small diameter opening 22 at the bottom of the conical surface 21. The diameter of the relatively small opening 22 is designed to allow the entry of the terminal leg portion 33 of the rod 30 into it, but otherwise is comparable in diameter to it, so that the terminal leg portionn 33 is held within it without any significant wobble or "play."

Figure 5:
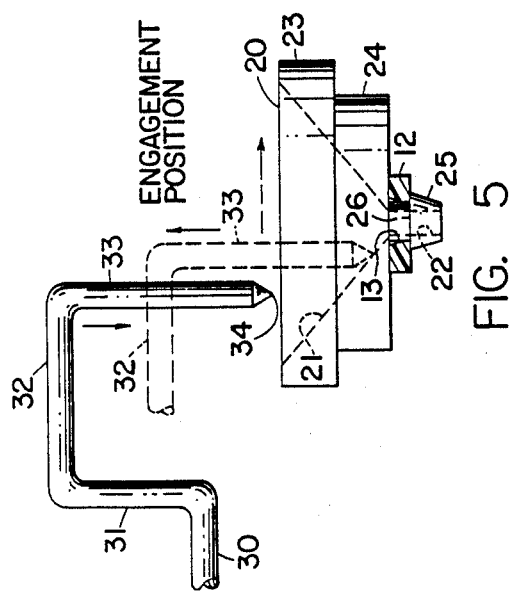
Figure 6:
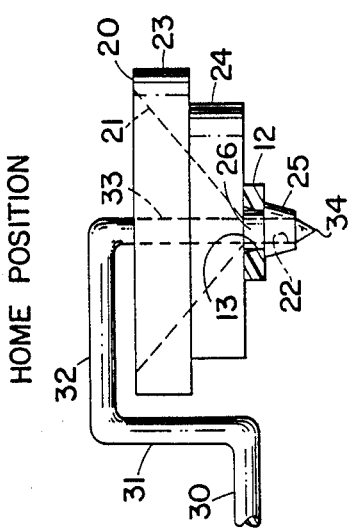
FIG. 6 is a view similar to that of FIG. 5, except showing the distal tip of the actuator rod in its locked or "home" position in the central opening.

Thus, for example, with reference to FIGS. 5 & 6, as the trim panel 1 is pushed longitudinally into engagement with the door frame 2, the interaction between the tapered surface 21 and the terminal leg portion 33 of the rod 30 causes the receptor cup 20 to be automatically moved over with respect to the door members, as the distal tip 34 moves down into the opening 22, until the distal tip extends down through the opening 22 to the "home" position, as illustrated in FIG. 6. The relative, interfacing movement between the terminal leg portion 33 and the receptor cup 20 is shown by the "up" and "down" arrows in FIG. 5, with the guiding, centrally directed, biasing force produced by the tapered surface 21 being shown by the phantom lined arrow directed to the right in FIG. 5. When the rod occupies the relative position shown in FIG. 6, with respect to the receptor cup 20, the two are effectively locked together, so that, when the locked power mechanism 10 is actuated, the driven pivoting movement of the receptor cup 20 causes the rod 30 to be moved accordingly, to-and-fro, going to and from its locked and unlocked dispositions under the control of the mechanism 10.

On the other hand, should it ever be necessary to have repair work done on any of the components located within the door, the trim panel module 1 is merely unfastened from the door frame 2 and moved away from it, during which step the distal tip 34 and the terminal leg portion 33 merely are withdrawn out of and from the receptor or guidance cup 20 on an automatic, unattended basis.

It should be understood that, after the trim panel module 1 has been completely assembled together with the door frame 2, and the door lock is actuated from the interior side of the vehicle door, the movement of the actuator arm 12 is transmitted to the door lock mechanism rod 35 at the door-lock/vehicle-body interface solely by the locking engagement between said receptor element or cup 20 and the rod.

As can be seen, for example, in FIGS. 2 & 4, the receptor 20 is generally cylindrical in its side configuration, having two, stepped sections 23 & 24, one (24) of lesser diameter than the other (23). The lesser diameter portion 24 can be used to limit the lateral movement of the receptor cup 20, if so desired.

The receptor cup 20 can be made of, for example, rubber or flexible plastic or other suitable material and, as can be seen in FIGS. 2 & 5, includes at its bottom a tapered tip portion 25, which allows it to be snap inserted into a mating opening 13 in the pivot link 12, until it is in its snapped-on, attached position shown in FIG. 5. As can be seen in FIG. 2, above the tapered tip 25 is the smaller diameter neck portion 26 which has a length "L" substantially equal to the thickness "T" of the link arm 12.

It is noted, of course, that the receptor cup 20 is attached to its link 12 in the preassembly, off-site operation where the trim panel module 1 is manufactured, its exploded illustration in FIG. 2 being included for illustrative purposes only.

Figure 7:
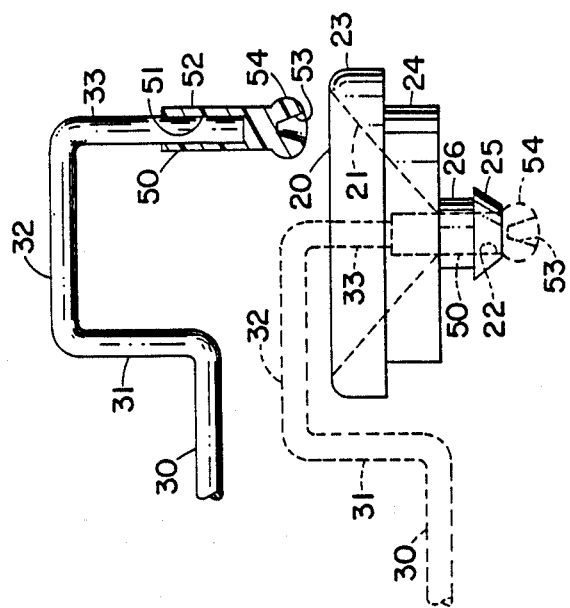
FIG. 7 is a side, close-up, detail view of a second, alternate embodiment for the distal tip of the actuator rod, illustrating in solid line an exemplary, initial, approach position of the rod moving towards the open side of the recpetor cup and in phantom line its final locked position in the central opening, with the enlarged head of the distal tip of the alternate rod design the being further mechanically locked into the opening by having been snapped through the opening.

An alternative embodiment for the terminal leg portion 33 of the locking rod 30 is illustrated in FIG. 7. As can be seen, a nub 50 is included on the terminal portion of the terminal leg 33, by means of inserting the terminal leg 33 into the cylindrical cavity 51 of the nub 50. Extending from the main body 52 of the nub 50 is an enlarged, terminal head portion 54 surrounding a centrally located, hollow cavity 53. The presence of the terminal, enlarged head portion 54 and the cavity 53 allows the terminal leg portion 33 to be initially squashed and then snapped into a mechanically locked disposition with the opening 22.

After the panel 1 has been attached to the door frame 2, actuation of the door lock actuator 10 will cause the door lock mechanism 40 to be locked and unlocked, with the movement of the driven link arm 12 being translated to the mechanism through the locked interface between the cup 20 and the rod 30.

Although the preferred exemplary embodiment has been illustrated with the receptor, guidance cup 20 located on the panel module 1 and the pointed distal tip 34 located on the door frame 2, these relative components could be switched, that is the receptor cup could be placed at the terminal end of the rod 30, with an interfacing rod tip being located on the locking mechanism 10 on the panel module 1. Additionally, rather than utilizing a pivoting link arm 12 with its arcuate motion, with an appropriately re-configured locking mechanism, the motion could be made purely linear. Additionally, the receptor 20, rather than forming a full circle, could use only a laterally disposed, circular section or segment having a rectangular frontal configuration, if its axis were properly aligned with the direction of movement of the rod 30.

These are, of course, merely exemplary modifications and not at all exhaustive of the many variations with can be made in the preferred, exemplary embodiments disclosed in detail above.

Although this invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and described to be secured by Letters Patent is claimed below.

We claim:

1. An automotive door assembly method, in which a door panel module is attached to a door frame element and in which interfacing components of a mechanical assembly for the door are included, one interfacing part on the door panel module and a matingn part on the door frame element, comprising the follows steps:
   (a) at least generally aligning the automotive door panel module with the automotive door frame element and moving the two toward each other into at least genral interfacing juxtaposition without any assurances that the two innterfacing components are precisely laterally aligned; and
   (b) utilizing a receptor eleement having a tapered surface loading to a central area having a central lockingn engagement member on one of the mechanical components and an extended projecting tip of the other of said components to interface the two components together; and
   (c) using the tapered surface to automatically laterally guide the projecting tip into the central locking engagement member, the engagement between the tapered surface and the projecting tip causing relative, lateral movement between the two bringing them into longitudinal alignment until the tip and the locking engagement member ar lockingly engaged, the two elements being automatically lockingly engaged together for combined operative movement together after the door assembly operation has bene completed.

2. The method of claim 1, wherein the projecting tip is included on the distal end of a laterally moveable door lock linkage rod attached to the door frame element, the receptor element being included on the door panel module; and wherein there is included the step (s) of:

moving the panel module with its receptor element towards the door frame element with its laterally extended rod, allowing said reactor element to be automatically laterally moved from an original disposition to another disposition due to the interaction of the distal tip being moved down against the tapered surface of the receptor element, until the distal tip moves in and goes through a centrally located, bottom opening in the recpetor element.

3. The method of claim 2, wherein, after all of the foregoing steps have been performed, there is further included the step(s) of:

actuating the door lock from the interior side of the vehicle door, the movement of the actuator being transmitted to the door lock mechanism at the door-lock-/vehicle-body interface solely by the locking engagement between said receptor element and said rod.

4. The method of claim 2, wherein, after all of the foregoing steps have been performed, there is included the further step(s) of:

removing the door panel module from the door frame element, the door lock interfacing components being disconnected and disengaged merely by pullingn the panel module longitudinally away from the door frame element.

5. An automotive door assembly, interfacing system for an automotive door frame means movably attached to a vehicle body, comprising:

automotive door panel module means for attachment to the door frame means in a vehicle assembly line operation; and a mechanical component interfacing system between the two door portion means, including a receptor element mounted on one of said door portion means having a tapered surface leading into a centrally located engagement element; and a projecting tip located on the other of said door portion means, said projecting tip being capable of lateral movement from one lateral position to another, spaced, lateral position in its door operative use, the distance between said laterally spaced positions being less than the opening into said tapered surface on said receptor element.

6. The automotive door interface system of claim 5, wherein said tapered surface forms at least in its lateral extent oppositely diverging surfaces of a "V" configuration, the apex of which leads into said engagement element.

7. The automotive door interface system of claim 6, wherein said tapered surface is conical in shape.

8. The automotive door interface system of claim 5, wherein said laterally extended rod includes an inverted "U" shaped portion which extends initially along side the receptor cup and then across over the top of the rceptor element and then down into the tapered surface to siad engagement element when the two door portion means are attached together.

9. The automotive door interface system of claim 5, wherein said distal tip includes a nub with an enlarged head, and said engagement element includes an opening into which said nub is lockingly engaged with acid door portion means are assembled together.

10. The automotive door interface system of claim 5, wherein said receptor cup is mounted on said modular door panel means.

11. The automotive door interface system of claim 10, wherein said modular door panel means further includes a lock actuator, and said receptor cup is mounted on said lock actuator by means of a driven pivoting link arm.

* * * * *